(12) United States Patent
Jung et al.

(10) Patent No.: US 10,279,505 B2
(45) Date of Patent: May 7, 2019

(54) MULTI-FUNCTIONAL END EFFECTOR WITH INTEGRATED WATERJET, MILLING SPINDLE SYSTEM AND/OR SCANNING SENSOR, AND A FLUID STREAM CATCHER MOUNTING SYSTEM

(71) Applicant: PaR Systems, Inc., Shoreview, MN (US)

(72) Inventors: Thomas E. Jung, Welch, MN (US); Andrew McChain, Minneapolis, MN (US)

(73) Assignee: PAR SYSTEMS, LLC, Shoreview, MN (US)

( * ) Notice: Subject to any disclaimer, the term of this patent is extended or adjusted under 35 U.S.C. 154(b) by 773 days.

(21) Appl. No.: 14/620,080

(22) Filed: Feb. 11, 2015

(65) Prior Publication Data
US 2015/0298343 A1 Oct. 22, 2015

Related U.S. Application Data

(60) Provisional application No. 61/938,598, filed on Feb. 11, 2014.

(51) Int. Cl.
*B23P 23/02* (2006.01)
*B23C 1/12* (2006.01)
(Continued)

(52) U.S. Cl.
CPC ............... *B26F 3/008* (2013.01); *B23C 1/00* (2013.01); *B23C 1/12* (2013.01); *B23P 23/02* (2013.01);
(Continued)

(58) Field of Classification Search
CPC .......... Y10T 83/364; Y10T 29/5152–29/5176; Y10T 29/519; Y10T 29/5105–29/5108;
(Continued)

(56) References Cited

U.S. PATENT DOCUMENTS 4,590,578 A * 5/1986 Barto, Jr. ................. B21J 15/10
318/632
5,331,770 A 7/1994 Ichinohe et al.
(Continued)

FOREIGN PATENT DOCUMENTS

CN 203317037 U * 12/2013
CN 108326554 A * 7/2018
(Continued)

OTHER PUBLICATIONS

Machine Translation of DE 202012010050 U1, which DE '050 was published Jan. 2013.*

(Continued)

*Primary Examiner* — Erica E Cadugan
(74) *Attorney, Agent, or Firm* — Steven M. Koehler; Westman, Champlin & Koehler, P.A.

(57) ABSTRACT

A multifunctional end effector includes a support structure configured to be carried by a robotic system and at least two of a fluid stream cutting system, a spindle system and/or a scanning system, each mounted to the support structure. Also described is a fluid stream cutting system having a plurality of fluid stream catchers selectively mountable to the fluid stream system and a mounting arrangement for mounting each fluid stream catcher to the fluid stream cutting system.

26 Claims, 13 Drawing Sheets

(51) Int. Cl.
| | |
|---|---|
| *B26F 1/26* | (2006.01) |
| *B26F 3/00* | (2006.01) |
| *B23Q 1/54* | (2006.01) |
| *B23Q 17/20* | (2006.01) |
| *B23Q 39/02* | (2006.01) |
| *B25J 11/00* | (2006.01) |
| *B25J 19/02* | (2006.01) |
| *B23Q 3/155* | (2006.01) |
| *B23Q 17/24* | (2006.01) |
| *B25J 15/00* | (2006.01) |
| *B23C 1/00* | (2006.01) |
| *B23Q 39/00* | (2006.01) |
| *B26D 5/00* | (2006.01) |

(52) U.S. Cl.
CPC ........... *B23Q 1/5406* (2013.01); *B23Q 17/24* (2013.01); *B23Q 17/2471* (2013.01); *B23Q 39/027* (2013.01); *B25J 11/0055* (2013.01); *B25J 15/0057* (2013.01); *B25J 15/0066* (2013.01); *B25J 19/021* (2013.01); *B26F 3/004* (2013.01); *B23Q 3/15566* (2013.01); *B23Q 2039/004* (2013.01); *B23Q 2220/002* (2013.01); *B23Q 2220/006* (2013.01); *B26D 5/007* (2013.01); *Y10S 901/41* (2013.01); *Y10S 901/44* (2013.01); *Y10S 901/47* (2013.01); *Y10T 29/5107* (2015.01); *Y10T 29/5155* (2015.01); *Y10T 29/5168* (2015.01); *Y10T 83/364* (2015.04); *Y10T 409/308512* (2015.01); *Y10T 483/17* (2015.01)

(58) Field of Classification Search
CPC .......... Y10T 408/37; Y10T 82/2506–82/2508; Y10T 82/2587; Y10T 83/0591; B26F 3/008; B26F 3/004; B26F 2003/006; B26F 1/26; B25J 15/0066; B25J 15/0057; B25J 15/0052; B25J 15/0061; B23Q 2039/004; B23Q 2220/002; B23B 29/24–29/34; B23B 39/20–39/205
USPC ................... 83/177, 53; 29/35.5–56.5, 33 J, 29/26 R–26 B; 408/35; 82/120–121, 159
See application file for complete search history.

(56) References Cited

U.S. PATENT DOCUMENTS

| | | | | | |
|---|---|---|---|---|---|
| 5,458,443 | A | * | 10/1995 | Beige | B21J 15/10 408/129 |
| 5,791,032 | A | * | 8/1998 | Spencer | B23Q 1/0009 29/39 |
| 6,049,580 | A | * | 4/2000 | Bodin | B24C 1/045 299/17 |
| 2002/0124700 | A1 | | 9/2002 | Aulson | |
| 2012/0255937 | A1 | | 10/2012 | Oe et al. | |
| 2013/0306748 | A1 | * | 11/2013 | Hashish | B26F 3/008 239/11 |
| 2015/0298342 | A1 | * | 10/2015 | Nordell | B05B 15/0406 239/1 |

FOREIGN PATENT DOCUMENTS

| | | | |
|---|---|---|---|
| DE | 4244407 | A1 | 7/1994 |
| DE | 102008009832 | A1 | 8/2009 |
| DE | 202011103055 | U1 * | 1/2012 |
| DE | 202012010050 | U1 * | 1/2013 |
| EP | 2508293 | A1 | 10/2012 |
| EP | 2821872 | A1 | 1/2015 |
| WO | WO-2009/078054 | A2 * | 6/2009 |

OTHER PUBLICATIONS

Machine Translation of DE 202011103055 U1, which DE '055 was published Jan. 2012.*

Machine Translation of CN 203317037 U, which CN '037 was published Dec. 2013.*

Notification of the transmittal of the International Search Report and the Written Opinion of the International Searching Authority, or the Declaration, dated Sep. 7, 2015.

Invitation to Pay Addition Fees for corresponding International Application No. PCT/US2015/015492 filed Feb. 11, 2015, dated Jul. 1, 2015.

* cited by examiner

MULTI-FUNCTIONAL END EFFECTOR WITH INTEGRATED WATERJET, MILLING SPINDLE SYSTEM AND/OR SCANNING SENSOR, AND A FLUID STREAM CATCHER MOUNTING SYSTEM

BACKGROUND

The discussion below is merely provided for general background information and is not intended to be used as an aid in determining the scope of the claimed subject matter.

Waterjet systems for cutting various forms of material are well known. In one known system, the waterjet cutter includes a large bath where a plate to be cut is disposed above the surface of the water in the bath. The waterjet cutter is commonly used to cut plates to obtain the workpiece where the waterjet stream is generally oriented towards the water bath. In this manner, energy of the waterjet stream after cutting through the material of the plate is dissipated in the water bath.

Another form of waterjet cutter includes a waterjet stream catcher that has an aperture in a housing that is spaced apart from an end of a nozzle of the waterjet cutter. The portion of the workpiece to be cut is disposed between the end of the waterjet nozzle and the aperture in the housing. The housing is fixedly connected to the waterjet nozzle so as to maintain the fixed relationship between the end of the nozzle and the aperture of the housing. In this manner, although the waterjet nozzle can be moved in up to six degrees of freedom in order to make a selected cut in the material to obtain the workpiece, the housing will track with the nozzle such that the waterjet stream after cutting the workpiece will enter the housing through the aperture. A vacuum hose is typically connected to the housing to remove the water and commonly at least some of the material cut from the housing in order to allow continuous operation.

Improvements to such a system are always desired.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background. It is one of the objects of the invention to improve the prior art assembly.

Aspects of the invention relate to a multifunctional end effector that includes a support structure configured to be carried by a robotic system and at least two of a fluid stream cutting system, a spindle system and/or a scanning system, each mounted to the support structure. Also described is a fluid stream cutting system having a plurality of fluid stream catchers selectively mountable to the fluid stream system and a mounting arrangement for mounting each fluid stream catcher to the fluid stream cutting system.

One or more of the following features can be provided on the end effector. In one embodiment said at least two of a fluid stream cutting system, a milling spindle system and/or a scanning system are mounted to the support so a nozzle of the fluid stream cutting system, a spindle of the spindle system and/or a scanning device of the scanning system face in different directions.

In another embodiment, the end effector includes at least a scanning system and a fluid cutting system, wherein the scanning system and the fluid cutting system face in opposite directions. If desired, the end effector can include a spindle system wherein the spindle system faces in a direction away from the scanning system and the fluid cutting system. In such a system, the spindle system can face in a direction orthogonal to each of the scanning system and the fluid cutting system.

A frame member is configured to be carried by the robotic system. To allow rotation, a rotational support connects the support structure to the frame member. The rotational support that connects the support structure to the frame member can be single sided on the end effector so as that the end effector is mounted in a rotatable cantilevered manner. If desired, a second rotational support can be provided on a side opposite the first-mentioned rotational support.

A housing forming a passageway can be provided with a first end disposed about on axis of rotation and a second end secured to the frame member. The housing can be on a side opposite the first-mentioned rotatational support.

The support structure can include an aperture configured to allow an elongated portion of one of said at least two of a fluid stream cutting system to extend into the support structure, while an elongated portion of another of said at least two of a fluid stream cutting system extends along an outside side of the support structure. If desired, yet another elongated portion of another of said at least two of a fluid stream cutting system can extend along an outside side of the support structure. When at least three systems are mounted to the support structure, said at least three systems comprising at least two of the fluid stream cutting system, the spindle system and/or the scanning system, the third of said at least three systems can include an elongated portion extending along the outside side of the support structure or another outside side of the support structure, any of the foregoing providing a compact assembly.

Another aspect of the invention is an assembly including a fluid cutting system having a nozzle and a first portion configured to carry a fluid stream catcher; and a fluid stream catcher having a second portion configured to mate with the first portion on the fluid cutting assembly, the first portion and the second portion together comprising a mounting arrangement to removably mount the fluid stream catcher fixedly to the fluid cutting system proximate the nozzle through relative movement between the fluid cutting system and the fluid stream catcher.

One or more of the following features can be provided. The first portion can include a first aperture and the second portion includes a second aperture, each aperture configured to pass fluid and other material from cutting therethrough, the apertures being aligned and fluidly sealed when the first portion and the second portion are mated.

The first portion and the second portion can include complementary inclined surfaces with respect to a direction of the relative movement between the fluid cutting system and the fluid stream catcher, the first and second apertures being located on the complementary inclined surfaces.

Each of the first portion and the second portion can include spaced apart flange sections that mate together with relative movement between the fluid cutting system and the fluid stream catcher.

A force generating device can be provided to generate a force that brings the first and second portion together. The force generating device can comprise cams, levers and the like. In one embodiment, at least one magnet secured to at least one of the first portion and the second portion provides an attractive force, and in particular, wherein the attractive force is in the direction of relative movement between the fluid cutting system and the fluid stream catcher. If desired, force generating devices such as a magnet can be secured to at least one of the flange sections of each pair of mating flange sections.

The assembly of can include a support structure secured to and carrying the fluid cutting assembly and at least one of a spindle system and a scanning system, said at least one of a spindle system and a scanning system together with the fluid cutting system comprising a multi-functional end effector. In this manner any of the above multi-functional end effector features can be provided.

Another aspect of the invention is an assembly including a robotic system having a movable end; a fluid cutting system mounted to the movable end and having a nozzle and a first portion configured to carry a fluid stream catcher; and a plurality of fluid stream catchers, each fluid stream catcher being of a different size and/or shape and having a second portion configured to selectively mate with the first portion on the fluid cutting assembly.

If desired, the support assembly is configured to support each fluid stream catcher in a known position on the support assembly.

The assembly can further include a movable member mounted adjacent to the nozzle to move at least partially about the nozzle, the movable member carrying the first portion. The first portion and each second portion comprise a mounting arrangement, which can have any of the above-described features. Likewise, a support structure can be secured to the movable end and carry the fluid cutting assembly and at least one of a spindle system and a scanning system, said at least one of a spindle system and a scanning system together with the fluid cutting system comprising a multi-functional end effector, in which case any of the features described above with respect to the multi-functional end effector can be included as desired.

Another aspect of the invention is a method of performing work upon a workpiece comprising: moving a multi-functional end effector having at least two of a fluid stream cutting system, a milling spindle system and/or scanning system as a unit adjacent a workpiece; orienting one of the fluid stream cutting system, a milling spindle system and/or scanning system toward a selected portion of the workpeice and performing work thereon; moving the multi-functional end effector as a unit toward another portion of the workpiece; and orienting a different one of the fluid stream cutting system, a milling spindle system and/or scanning system adjacent another portion of the workpiece performing work thereon. Each step of orienting can comprise rotating the multi-functional end effector as a unit so that a desired system is facing the workpiece.

DETAILED DESCRIPTION OF ILLUSTRATIVE EMBODIMENTS

A multifunctional end effector includes a support structure configured to be carried by a robotic system and at least two of a fluid stream cutting system, a spindle system and/or a scanning system, each mounted to the support structure. Also described is a fluid stream cutting system having a plurality of fluid stream catchers selectively mountable to the fluid stream system and a mounting arrangement for mounting each fluid stream catcher to the fluid stream cutting system.

Figure 1:
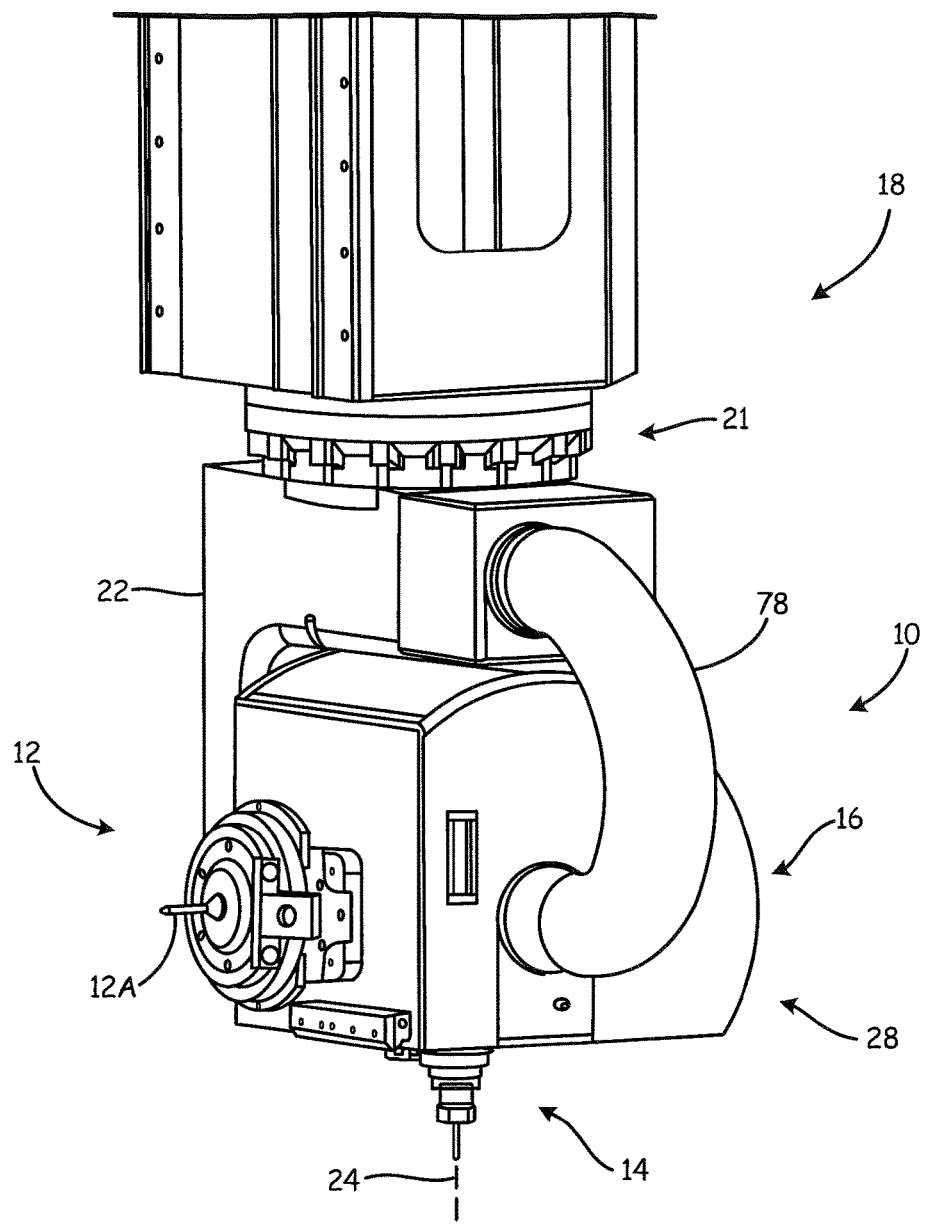
FIG. 1 is a perspective view of a multi-functional end effector mounted to an end of a robotic system.
Figure 2:
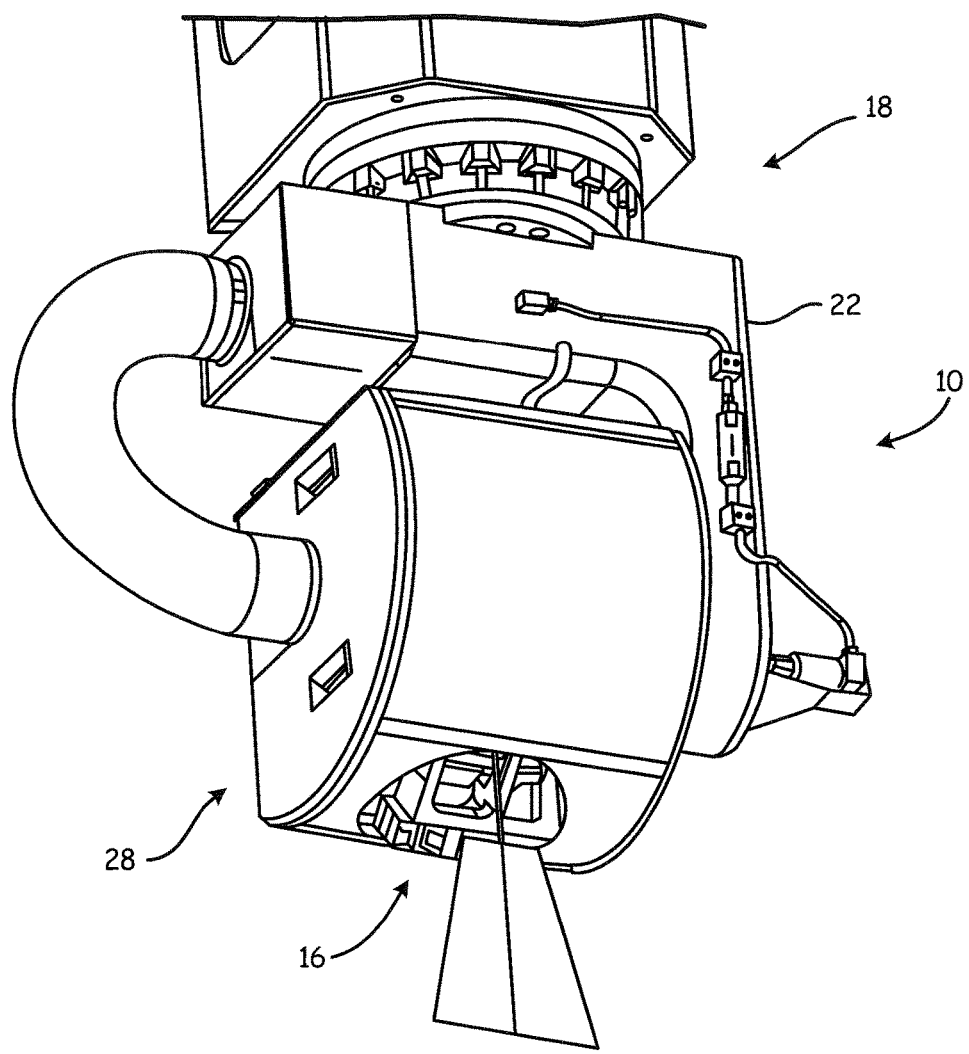
FIG. 2 is another perspective view of the multi-functional end effector.

A multi-functional end effector 10 having an integrated waterjet cutting system 12, a milling spindle system 14 and a scanning system 16 such as a laser scanning system is illustrated in FIGS. 1 and 2 mounted to a robotic system represented by mount 18. (Herein "waterjet cutting system" is used generically for any form of fluid cutting system). The robotic system does not form any part of the present invention and can take any number of forms. For instance, the mount 18 can be a multi-degree of freedom robotic arm. In another embodiment, the mount 18 can be part of a gantry robot having a bridge supported by one or more runways and moveable thereon. A telescoping tube or other form of support is carried by the bridge and comprises the mount 18. Again, the type of robotic system to which the end effector 10 is mounted is not pertinent to aspects of the present invention herein described, but being able to move the end effector 10 or parts connected thereto has advantages. Hence, to the extent the end is movable, a robotic system can be considered as part of some aspects of the present invention.

The end effector 10 includes a frame support 22 that is secured to the robotic system mount 18. The frame support 22 can be fixedly secured to the mount 18, or it can be moveably secured to the mount 18 as desired. In the embodiment illustrated, the frame support 22 is moveably secured to the mount 18 wherein the frame support 22 is mounted to a rotational bearing assembly 21 that can rotate about a central axis 24 using a suitable drive provided in mount 18, the details of which are not pertinent to the aspects of the invention herein described.

Figure 3:
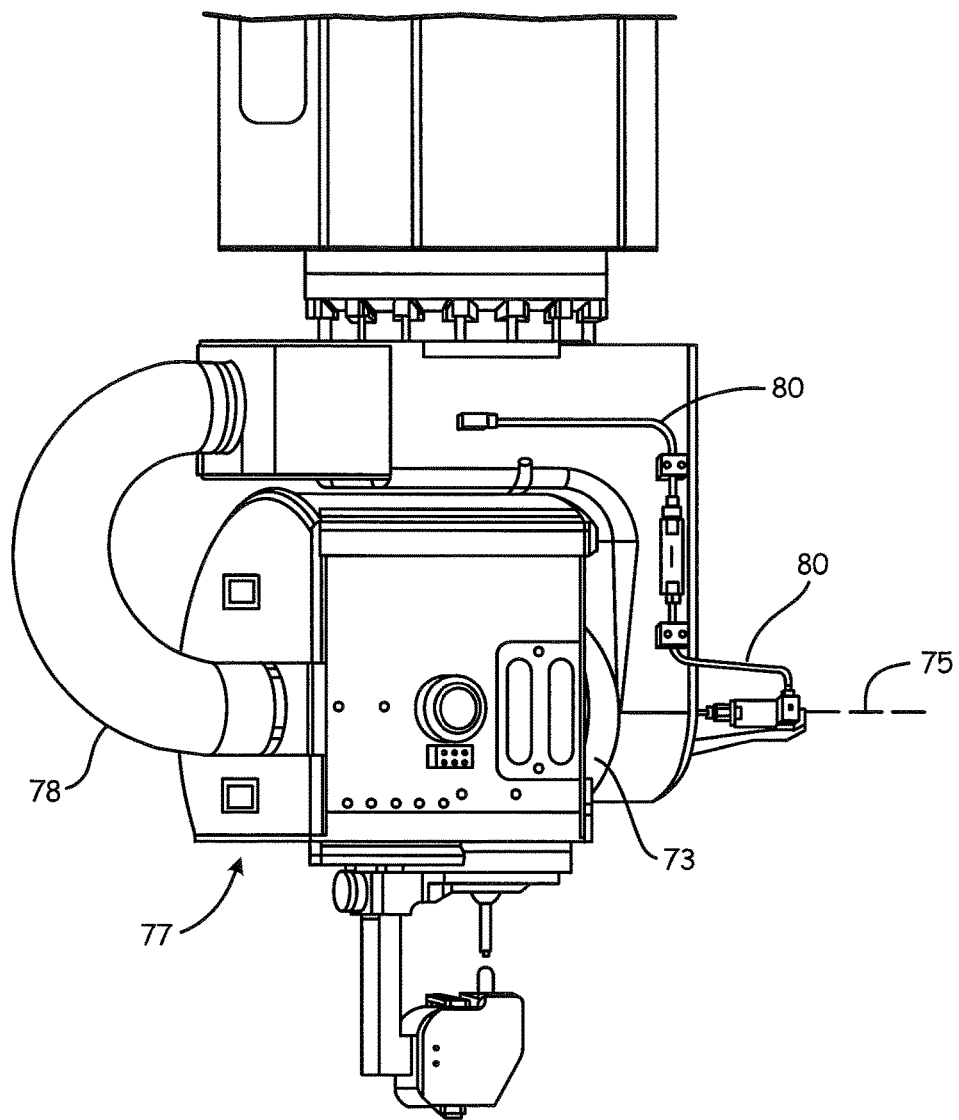
FIG. 3 is another perspective view of the multi-functional end effector.

A multi-function assembly 28 is moveably fixed to the frame support 22 in a manner so as to allow the multi-function assembly 28 to rotate through a plurality of positions so as to orient the fluid stream cutting system 12, milling spindle system 14 or scanning system 16 in an operable position as illustrated in FIGS. 1-3 when needed. In one embodiment, the multi-function assembly 28 supports at least two of the fluid stream cutting system 12, milling spindle system 14 and/or scanning system 16, while in a further embodiment, the multi-function support assembly 28 is configured with all three systems, as illustrated. At this point, it should be noted that in other embodiments the end effector can be equipped with two different forms of one or more of the fluid stream cutting system, milling spindle system or scanning system. For instance, in another embodiment two forms of the fluid stream cutting system can be provided. Likewise, in one embodiment the end effector may only have two of the fluid stream cutting system, milling spindle system or scanning system, or in yet other embodiments, four or more of these systems and/or along with other devices/systems can be provided on the end effector.

In FIGS. 1-3, the system 12, 14 or 16 that is being operated is oriented so as to generally extend away from the mount 18 such as but not limited to being directly opposite the mount 18, which in the figures illustrated points downwardly. However, it should be understood that this orientation should not be considered limiting and is provided only for purposes of understanding aspects of the present invention. In other words, the robotic system as represented by mount 18 could position the systems 12, 14 or 16 being operated to point in a direction other than downwardly in order to operate upon a workpiece as desired. Such positioning can be accomplished by movement of the mount 18 with or without rotational movement of the multi-functional support assembly 28 on the frame support 22.

Figure 4:
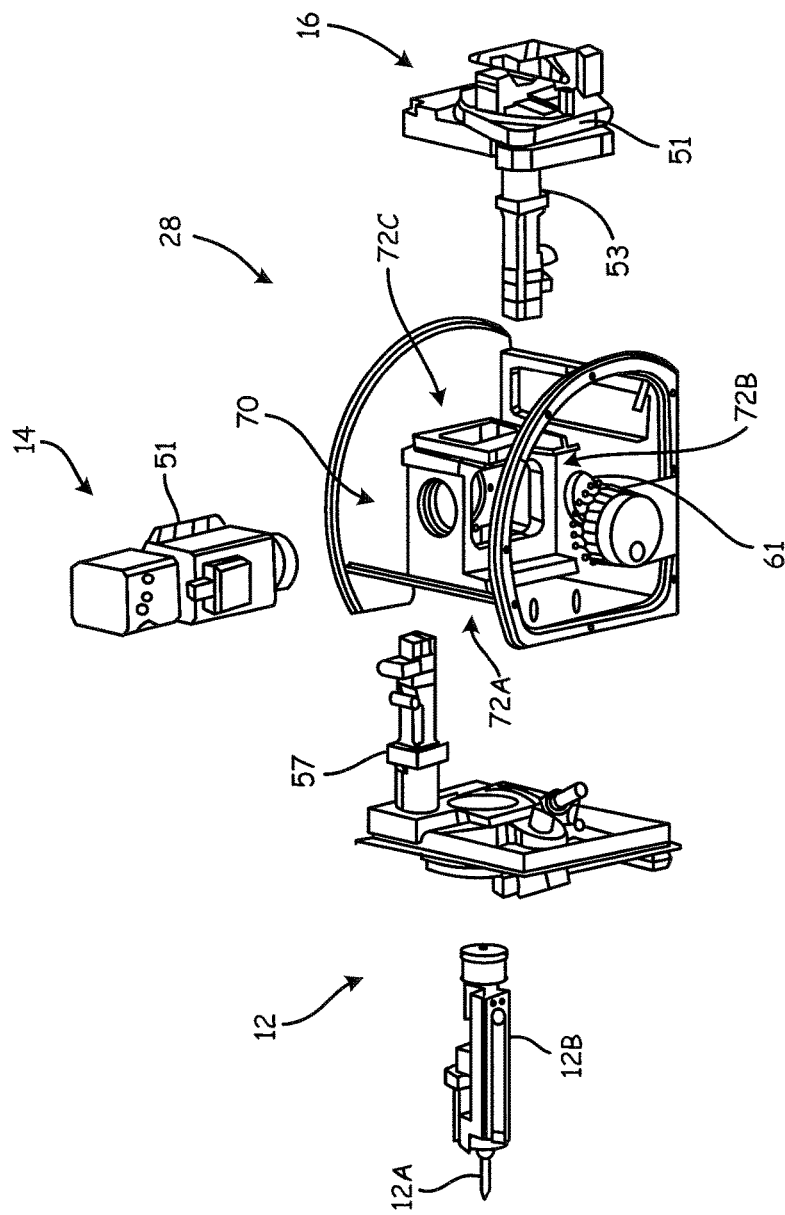
FIG. 4 is an exploded view of some of the components of the multi-functional end effector.

Referring to FIG. 4, the multi-function support assembly 28 includes a support structure 70 to which each of the systems 12, 14 and 16 is mounted. In one embodiment, the support structure 70 is preferably integral and can be formed, if desired, from a single unitary body. Various apertures are provided in the support structure 70 to allow some elements or wiring, tubing or the like of the systems 12, 14 and 16 if needed to extend therein so as to make multi-functional support assembly 28 more compact when assembled. The support structure 70 further includes suitable apertures such as threaded apertures allowing the elements of the systems 12, 14 and 16 to be mounted directly thereto.

In another embodiment, the multi-function support assembly 28 and in particular the support structure 70 can be directly mounted to a multi-degree of freedom robotic arm.

Figure 5:
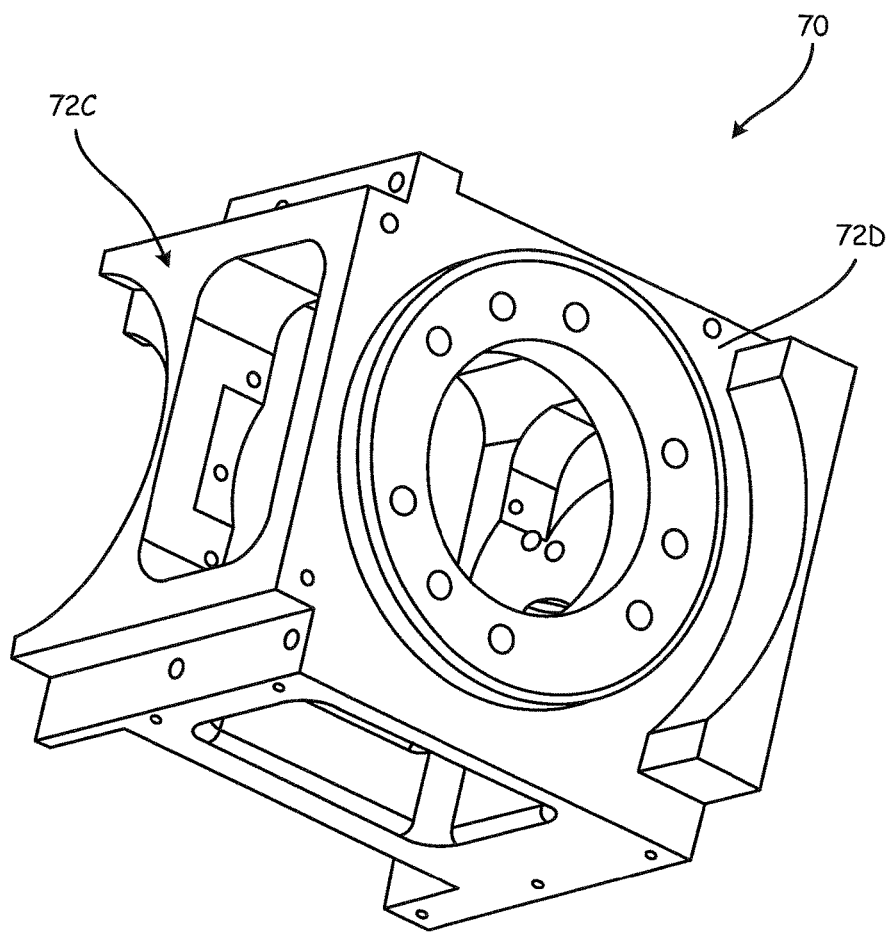
FIG. 5 is a perspective view of a support structure.
Figure 6:
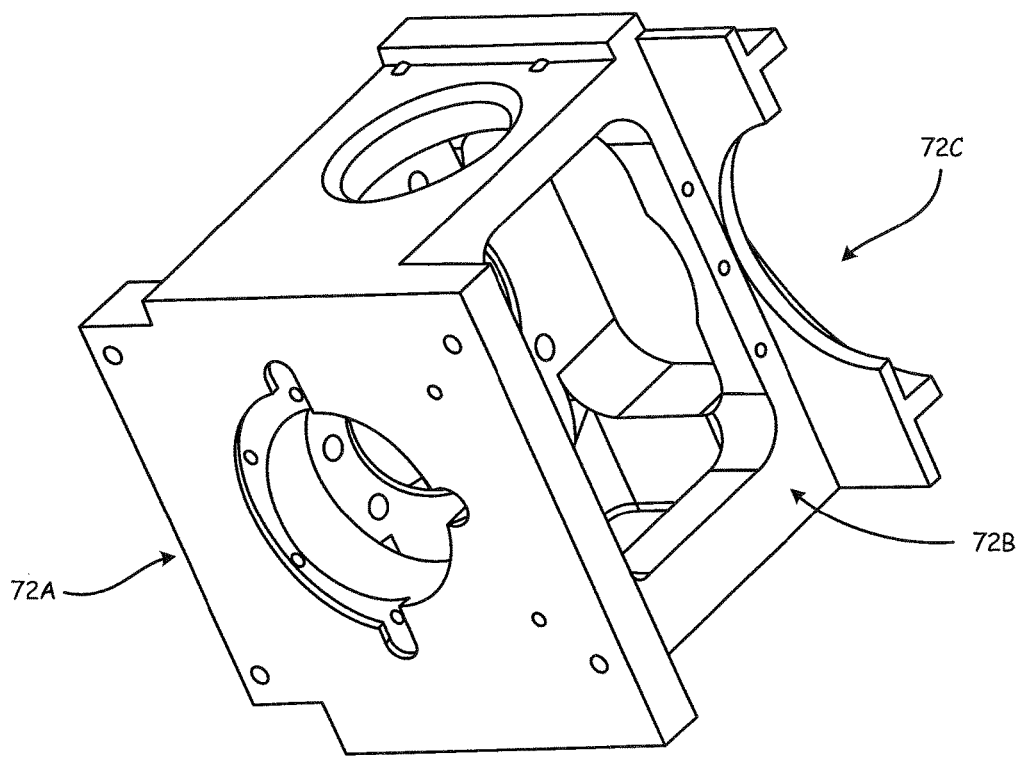
FIG. 6 is another perspective view of the support structure.

The multi-function support assembly 28 is configured so as to allow convenient independent removal and servicing of systems 12, 14 and 16 if needed. Generally, referring to FIGS. 4-6, the support structure 70 includes sides 72A, 72B and 72C where sides 72A and 72C face away from each other and side 72B faces in yet a different direction (e.g. orthogonal) to each of sides 72A and 72C. One of the systems 12, 14 and 16 is mounted to each one of the sides 72A-72C as illustrated in FIG. 4.

Figure 9:
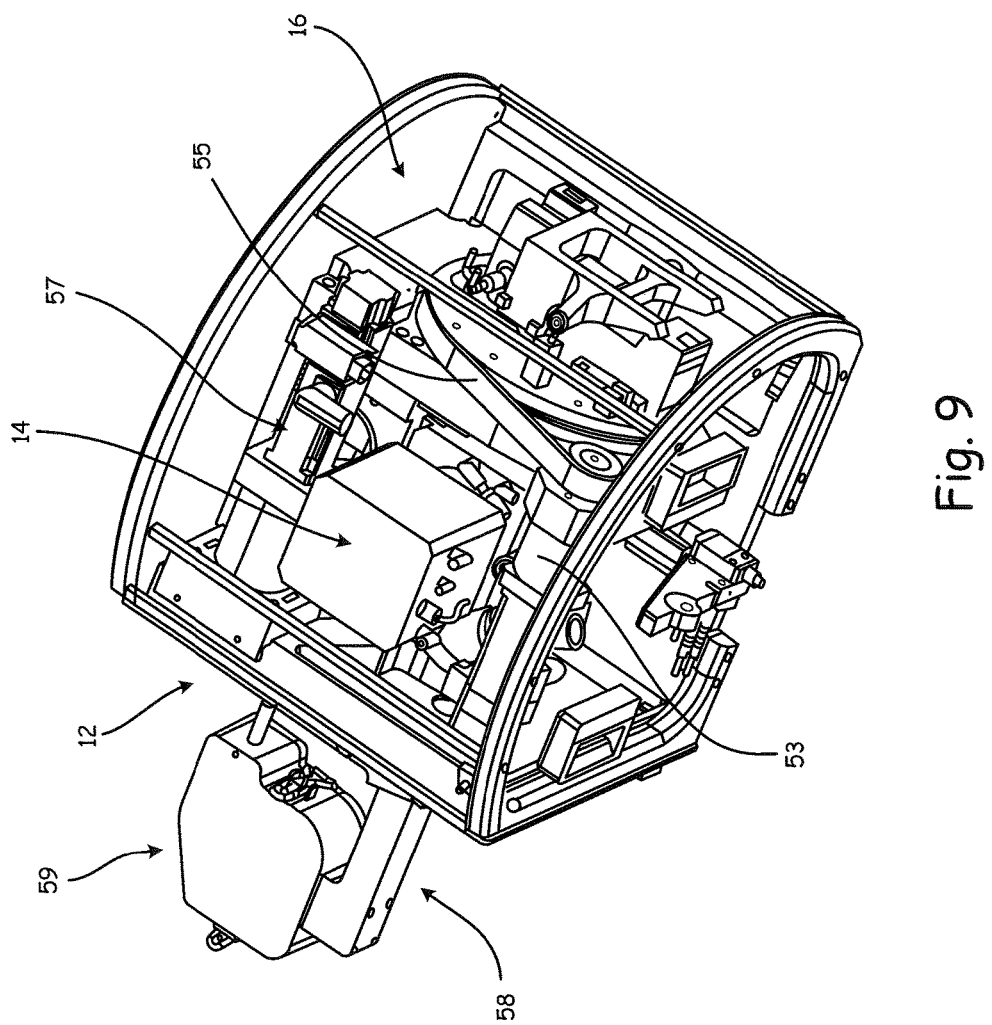
FIG. 9 is perspective view of the multi-functional end effector with parts removed.

Although each of the systems 12, 14 and 16 are generally known and commercially available, mounting of the systems 12, 14 and 16 to the support structure 70 yields a particularly compact assembly. Referring to FIGS. 4 and 9, a support plate 51 of the milling spindle system 14 is mounted to side 72B, wherein the spindle and motor assembly of the milling system 14 extend in a direction away from an aperture 61 through which at least a part of the spindle or cutting tool connected thereto extends therethrough.

The scanning system 16 includes a motor 53 and belt 55 to rotate components of the scanning system 16 as needed during operation. The motor 53 having a longitudinal length is disposed so to be positioned along one of the sides of the milling system 14, when the scanning system 16 is mounted to side 72C. Similarly, the fluid stream cutting system includes a motor 57 to selectively drive a mount 58 for a fluid stream catcher 59 so as to position the fluid stream catcher 59 as necessary to receive a fluid stream from a nozzle 12A of the fluid stream cutting system 12. As illustrated in FIG. 9, the motor 57 for the fluid stream cutting system 12 is disposed so as to extend on a side of the milling spindle system 14 opposite to that of motor 53, and in one embodiment over the support 70. A fluid stream nozzle assembly 12B connected to nozzle 12A illustrated in FIG. 4 when mounted has a length oriented to be parallel to the motor 53 and to extend into support 70.

Figure 7:
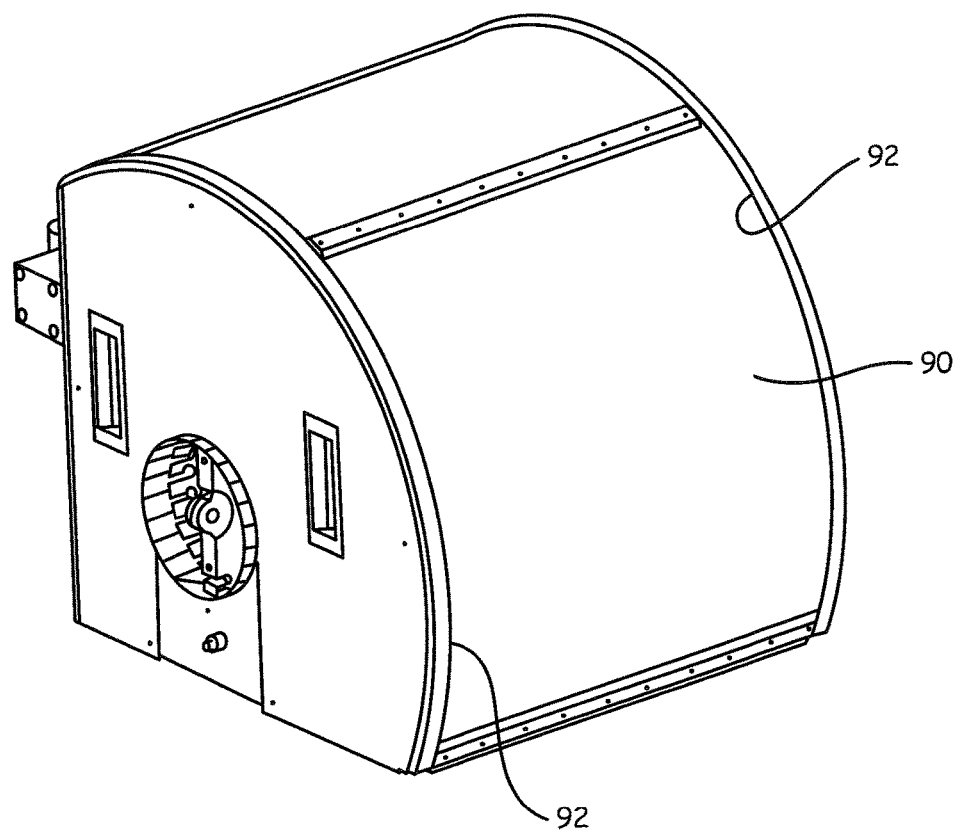
FIG. 7 is another perspective view of a portion of the multi-functional end effector.
Figure 8:
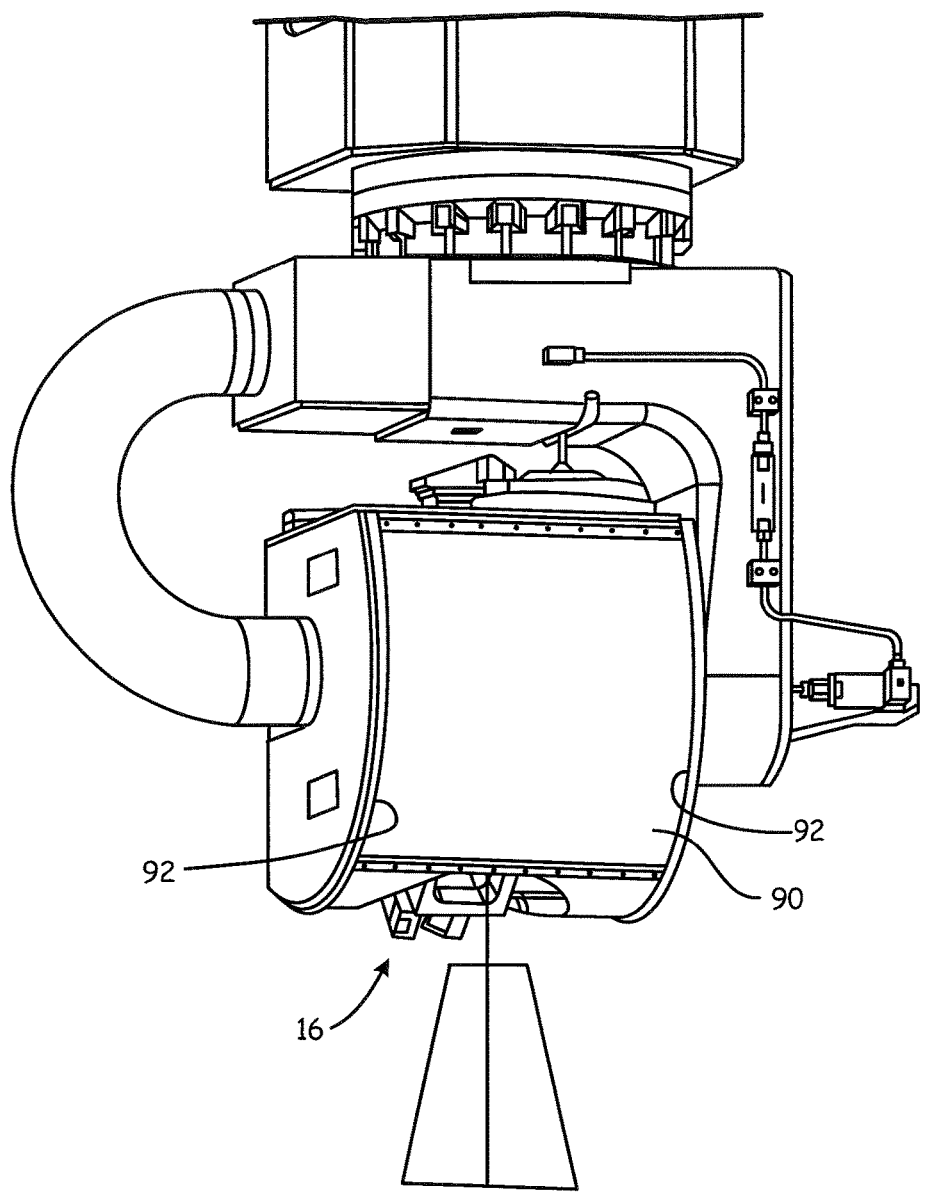
FIG. 8 is another perspective view of the multi-functional end effector.

It should be noted that it is advantageous for the scanning system 16 (such as but not limited to as a scanning device, e.g. camera or laser) to face in a direction opposite to that of the fluid stream cutting system 12 so as to minimize any fluid spray deflecting off the workpiece being cut to be sprayed in the direction of scanning system 16. A movable cover 90 is opened in FIG. 8 (closed in FIG. 7) to allow the scanning system 16 to function when directed at the workpiece. In the embodiment illustrated, the movable cover 90 slides along opposed guides 92. The cover 90 is operably coupled to any suitable drive mechanism such as an actuator or a motor driven mechanism provided in the multi-functional support assembly 28.

It is also advantageous for the milling spindle system 14 to be disposed so as to be oriented orthogonal to the scanning system 16 and the fluid stream cutting system 12. In other words, the scanning system 16 and fluid stream cutting system, and in particular, the nozzle 12A thereof, face in directions at least away (e.g. orthogonal) from the rotating spindle and/or cutting tool (not shown) of the milling spindle system 14. This is advantageous since shavings from the milling spindle system 14 tend to be thrown in a radial direction with respect to the cutting tool axis. Hence, with the waterject cutting system 12 and the scanning system 16 also oriented so as to be radial, or at least directed away, with respect to the cutting tool axis, the fluid stream cutting system 12 and scanning system 16 are then not in a position to reduce or minimize being struck by shavings from the milling spindle system 14.

Referring to FIG. 3, the support structure 70 is mounted to the frame support 22 on a side 72D that is orthogonal to each of the sides 72A-72C. A rotatable support assembly 73, such as but not limited to a bearing assembly, mounts the support structure 70 and thus the multi-functional support assembly 28 to the frame support 22. A suitable drive mechanism rotates the multi-functional support assembly 28 about an axis 75 (see for example FIG. 3). The drive mechanism can take any number of forms including a spindle fixedly secured to side 72D. The spindle can be driven by an endless flexible member such as a belt, or by gears that in turn are driven by a drive motor all of which are mounted in frame support 22. If desired, in a direct drive configuration, the drive motor can be directly mounted to side 72D. Any of the drive motors described herein can take any form such as an electric drive motor, a hydraulic motor or a pneumatically operated motor.

In the embodiment illustrated, the multi-functional support assembly 28 is secured to the frame member in a cantilevered manner so as to allow rotation of the multi-function support assembly about the axis 75, but also allow a housing 78, which can be flexible, to extend from a side 77 opposite the side providing cantilevered support. If desired, a rotational support can be provided on a side opposite rotational support 73. An end of the housing 78 can include a rotational support, which can be bearing assembly or a first tubular end secured to the assembly 28 to rotate therewith while a second tubular end of a remainder of the housing 78 remains stationary. The housing 78 provides a passageway for various wires and fluid lines to extend from the multifunctional support assembly 28 back to the frame support 22 and through the mount 18, if desired. In the embodiment illustrated, high pressure fluid for the fluid stream cutting system 12 is provided via tubing 80 secured to the frame support 22 and extending therethrough into the multi-functional support assembly 28 from a side opposite the housing 78 generally along axis 75. Direct mounting on the frame support 22 and therethrough provides better support than through the flexible housing 78.

Figure 10:
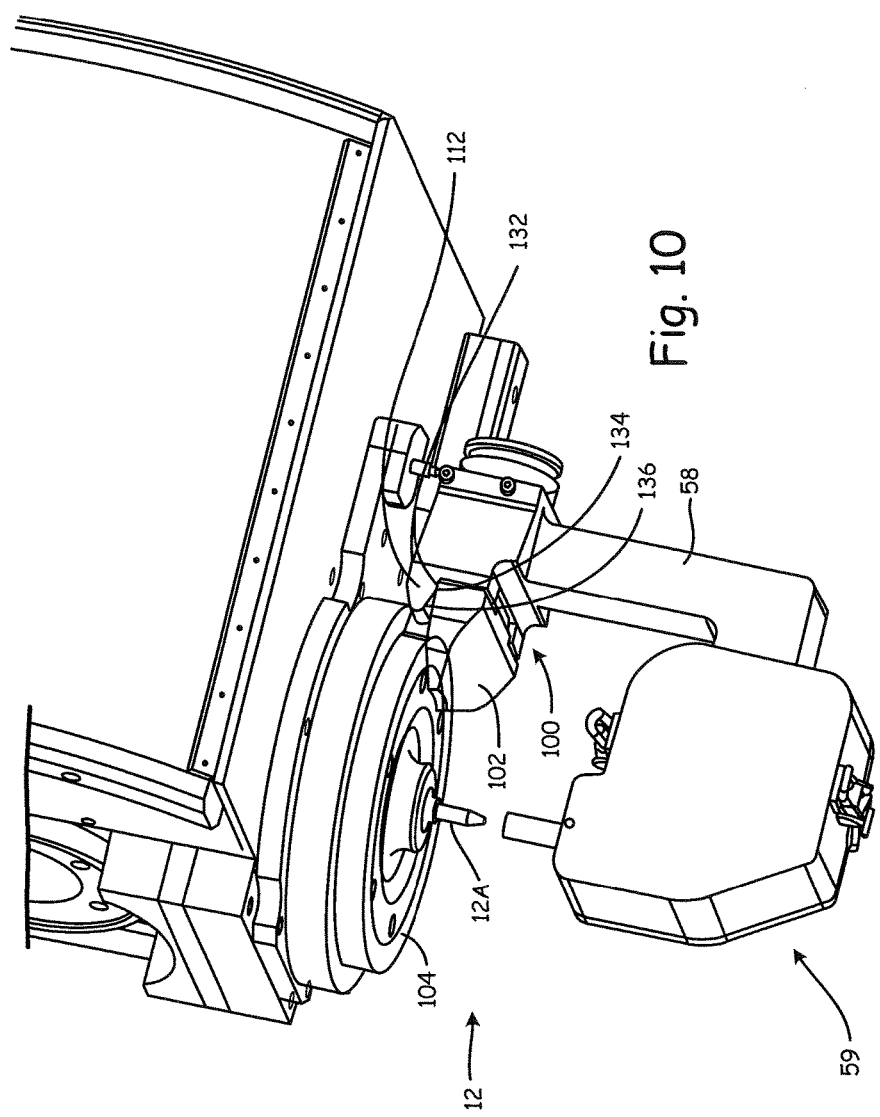
FIG. 10 is enlarged perspective view of the multi-functional end effector.

Referring to FIG. 10, another aspect of the invention includes a mounting arrangement 100 for removably mounting the fluid stream catcher 59 to the fluid stream cutting system 12, without the use of user operated fasteners (such as threaded bolts and the like) to form the connection. Stated another way, another aspect of the invention, is the manner in which surfaces of one or more fluid stream catchers mate together with surfaces of the fluid cutting system 12 so as precisely align the fluid stream catcher 59, 114 relative to the nozzle 12A. Generally, the mounting arrangement 100 includes a first portion or support 102 fixedly but removably secured to a ring member 104 to rotate, at least partially, therewith when driven by motor 57. The first portion 102 mates with a second portion or end 110 on each of one or more fluid stream catchers.

Figure 11:
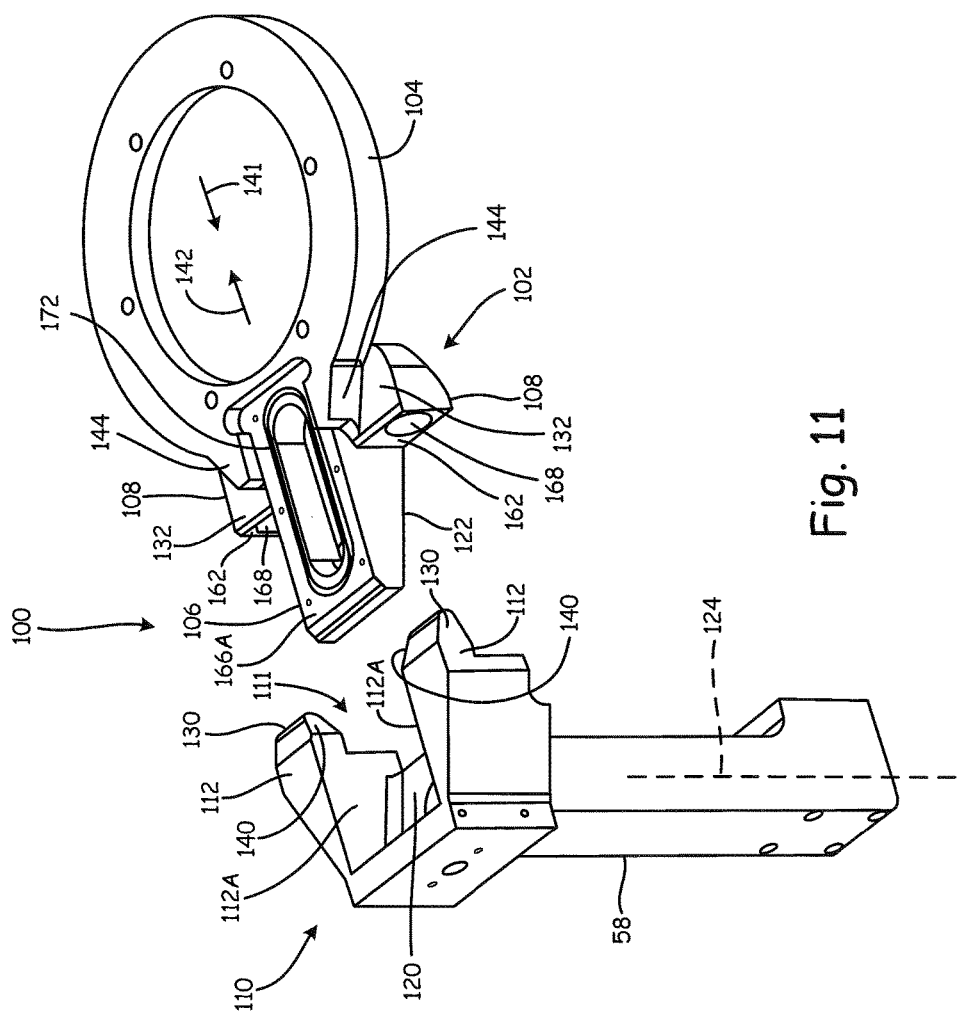
FIG. 11 is a perspective view of a mounting arrangement for a fluid stream catcher.

Referring also to FIG. 11, the support 102 includes a center section 106 and extending flange sections 108. The end 110 of the mount 58 includes complementary features that being a center recess 111 configured to receive the center section 106 therein, and extending end flanges 112 each having an inner surface 112A defining opposite sides of the recess 111.

Figure 12:
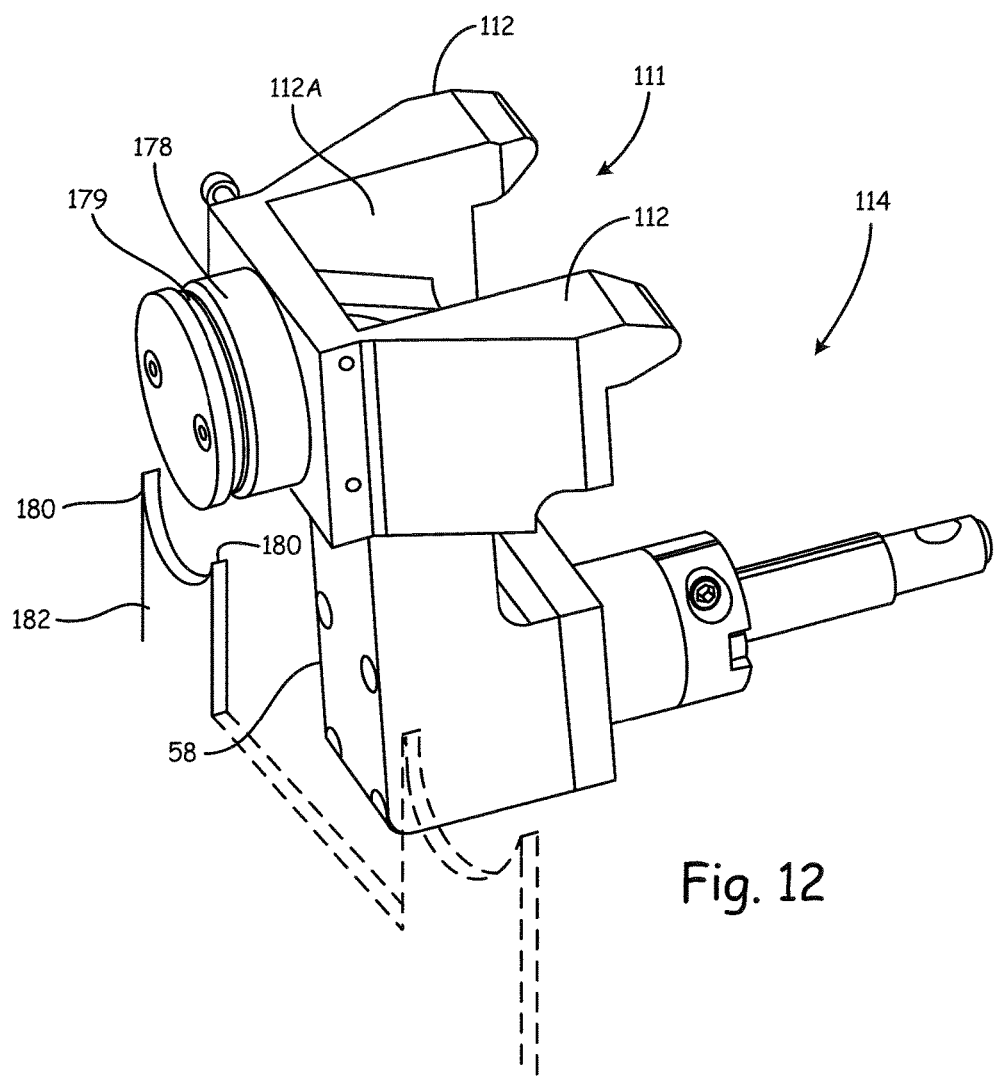
FIG. 12 is perspective view of a fluid stream catcher.

The mounting arrangement 100 is configured to allow the robotic system represented by mount 18 to move the multi-functional support assembly 28 (or just a fluid stream cutting system) to pick up and return the fluid stream catcher 59 from and to a selected location, that being a support assembly (shown schematically by holder 182) that holds the fluid stream catcher 59 when not in use. At this point it can be noted as another aspect of the present invention, the multi-functional support assembly 28 is configured to select and use a fluid stream catcher from a plurality of fluid stream catchers of different size and/or shape. Another exemplary fluid stream catcher 114 is illustrated in FIG. 12. Fluid stream catcher 114 for example is configured to work in spaces that the fluid stream catcher 59 could not function in. The fluid stream catchers 59 and 114 are merely examples of different fluid stream catcher configurations and should not be considered limiting but rather only illustrative. Common to each fluid stream catcher 59, 114 however is the second portion 110 of the mounting arrangement 100. The support assembly 182 can comprise multiple identical portions for holding each of the common portion present on each fluid stream catcher 59,114. Typically, the support assembly 182 would hold each common portion in a known position and manner such that the robotic system can position the fluid cutting assembly so as to selectively pick up the desired fluid stream catcher.

It should be understood that the use of a plurality of fluid stream catchers selectively mounted proximate a nozzle of a fluid stream cutting system as well as the mounting arrangement 100 herein described, is not limited to the end effector 10 herein described but can also be used with a system that only comprises a moveable fluid stream cutting system.

A lower surface 120 defining the recess 111 is complementary to a downwardly facing surface 122 of the support 102. In an advantageous embodiment, the surfaces 120 and 122 are oblique or inclined to a major horizontal plane of the ring member 104. Stated another way, the surfaces 120 and 122 are also oblique or inclined relative to a longitudinal axis 124 of the mount 58 from the end 110. Inclination of the surfaces 120 and 122 allows the support 102 to obtain the correct vertical alignment as the center section 106 is received in the recess 111. When the center section 106 is fully received in the recess 111, ends 130 of the flanges 112 are disposed on upper surfaces 132 of the flange sections 108 of support 102. One or more magnets, discussed below, or other force applying device drives the surfaces 120 and 122 together with movement of typically of the nozzle assembly by the robotic system toward the mount 58 in a direction represented by arrow 141 and helps hold the surfaces 120 and 122 together once a connection has be made and the catcher is in use. The mount 58 includes an aperture 170 that is aligned with an aperture 172. Through the apertures 170, 172 and corresponding passageways fluidly connected thereto fluid from the nozzle 12A and other material from the cutting process is drawn out of the fluid catcher 59,114 via a vacuum. Maintaining a tight sealed connection between the surfaces 120, 122 (or seal(s) therebetween) is desired.

Referring also to FIG. 10, at least a portion of lower surface 134 of end flanges 112 contacts surface 132. A leading portion 136 of the end flanges 112 can have the lower surface extending upwardly so as to allow the end flanges 112 to properly engage flange sections 108.

It should be noted end flanges 112 can include generally opposed side surfaces 140 that are inclined or oblique to a direction of movement of the center section 106 into the recess 111 as represented by arrow 141. The surfaces 140 can contact side surfaces 144 on flange sections 108 so as to aid orientation of the mount 58 to its proper position on support 102. Surfaces 140 and 144 also inhibit relative rotation of mount 58 on support 102.

Figure 13:
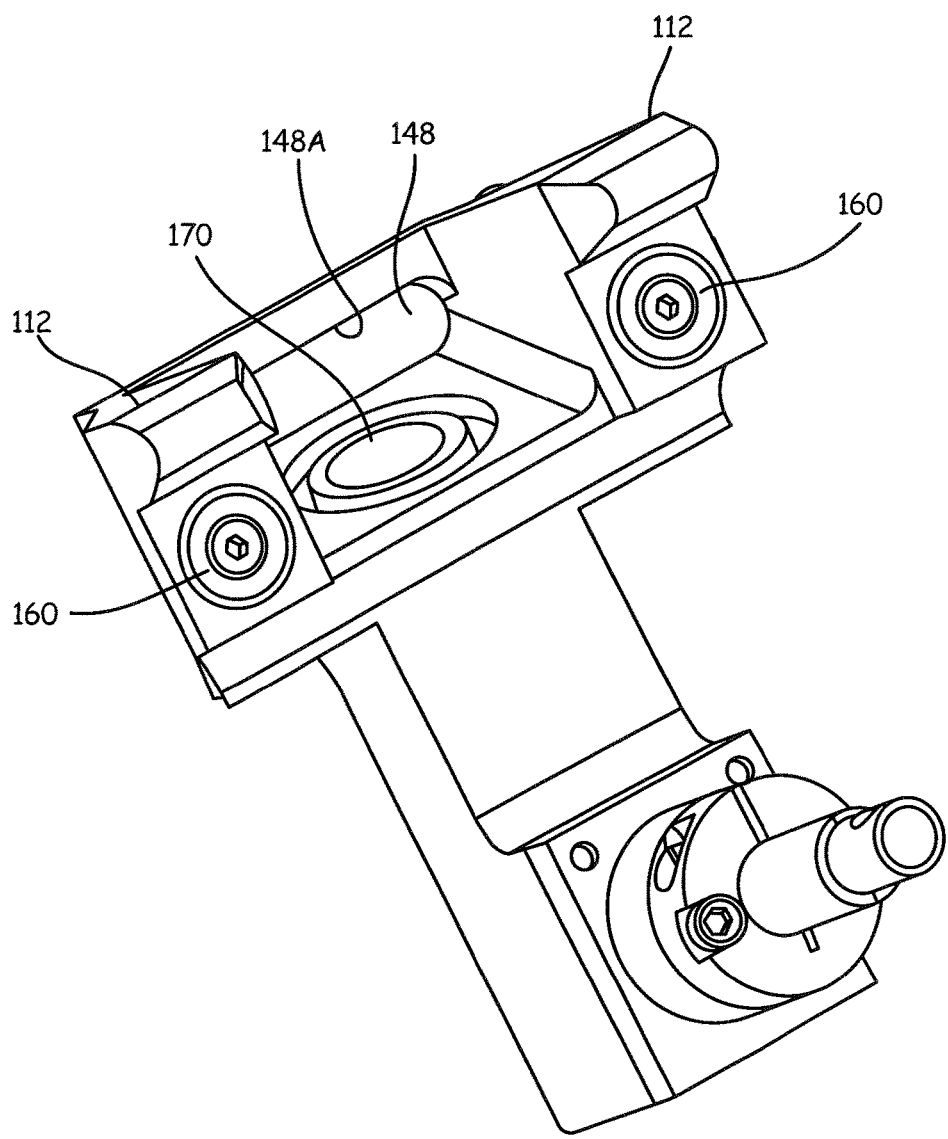
FIG. 13 is another perspective view of the fluid stream catcher.

If desired, the end 110 can be configured with a recess 148 (FIG. 13) that receives the end of center section 106 to also aid in obtaining proper orientation of the end 110 on the support 102 via contact of an upper surface 166A on a downwardly facing surface 148A of recess 148 such as to provide proper alignment about an axis parallel to arrow 142, which is also generally perpendicular to axis 124 in addition to vertical position of the end 110 and portion 102. In particular, contact between surfaces 166A and 148A in addition to contact between spaced apart surfaces 132 and 134 on spaced apart flange sections 108 provides three points of contact to maintain a desired vertical position as well as inhibit rotation along an axis parallel to direction 142.

As stated above magnet(s) can be used to provide a force in a direction 142 that secures the end 110 to support 102 and inhibits movement of the end 110 away from support 102. In the embodiment illustrated, two magnets 160 are disposed in flanges 112 face and surfaces 162 on flange sections 108. In a further preferred embodiment, the flange sections 108 also include magnets at 168 that are configured to face with the magnets 160 in flanges 112. Two or more spaced apart magnets increase stability of the end 110 to the support 102, and when disposed on opposite sides of the center section 106 provide a balanced attractive force in direction 142 between the end 110 and the support 102 on opposite sides of the center section 106, although in another embodiment the magnets are only at 108 and none are provided on the flanges 112.

The mount 58 is configured with a portion allowing the fluid stream catcher 59, 114 to be held in a stationary position when not in use. In the embodiment illustrated, the portion comprises a projection 178 having a groove 179 that mates with extending flanges 180 of a holder 182 schematically illustrated in FIG. 12. When the portion 178 is disposed in the holder 182 with the flanges engaging groove 179, the end 110 will remain stationary as the support 102 is pulled away from the end against the magnetic attraction of the magnet(s) 160, 168.

To mount a selected fluid stream catcher on the multi-functional support assembly 28, the robotic system moves the multi-functional support assembly 28 to the selected fluid stream catcher being supported on the holder 180 orienting the support so as to face the end 110 of the selected fluid stream catcher. The magnetic force from the magnet(s) can be used to secure the end 110 to the support 102 as described above. With the end 110 secured to the support 102, the robotic system moves the multifunctional support assembly 28 typically upwardly to remove the fluid stream catcher from the holder 180 where contact of the mating surfaces 132 and 134 generally supports the weight of the fluid stream catcher, while the magnetic attraction of the magnet(s) ensures that the surface remain in contact.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A multi-functional end effector, comprising:
   a frame member configured to be carried by a robotic system;
   a support structure rotatably mounted to the frame member to rotate about an axis;
   a cutting system fixedly mounted to the support structure and having an operating end configured to be directed toward an object in a first direction away from the support structure to cut the object; and
   a scanning system fixedly mounted to the support structure, the scanning system having a scanning device configured to be directed in a scanning direction away from the support structure to obtain a scan of the object,
   wherein rotation of the support structure about the axis causes simultaneous rotation of the operating end of the cutting system and the scanning device such that the first direction and the scanning direction remain extending in opposite directions for any rotation of the support structure.

2. The multi-functional end effector of claim 1 and further comprising a rotational support connecting the support structure to the frame member.

3. The multi-functional end effector of claim 1 wherein the cutting system is a fluid stream cutting system having a nozzle directing fluid in the first direction.

4. The multi-functional end effector of claim 3 and further comprising a second cutting system that includes a milling spindle system mounted to the support structure, and wherein an axis of rotation of a spindle of the milling spindle system extends away from the support structure in a direction different than the first direction and the scanning direction.

5. The multi-functional end effector of claim 4 wherein the axis of rotation of the spindle of the milling spindle system is orthogonal to each of the scanning direction and the first direction.

6. The multi-functional end effector of claim 2 wherein the cutting system is a fluid stream cutting system, wherein the operating end of the fluid stream cutting system is a nozzle directing fluid in the first direction.

7. The multi-functional end effector of claim 2 wherein the rotational support connects the support structure to the frame member in a cantilevered manner.

8. The multi-functional end effector of claim 1 wherein the cutting system is a fluid stream cutting system, wherein the operating end of the fluid stream cutting system is a nozzle directing fluid in the first direction, the fluid stream cutting system further comprising:
   a first portion movable with the nozzle; and
   a fluid stream catcher having a second portion configured to mate with the first portion,
      the first portion and the second portion together comprising a mounting arrangement to removably mount the fluid stream catcher fixedly to the nozzle through relative movement between the nozzle and the fluid stream catcher.

9. The multi-functional end effector of claim 8 wherein the first portion includes a first aperture and the second portion includes a second aperture, each aperture configured to pass fluid and other material from cutting there through, the apertures being aligned and fluidly sealed when the first portion and the second portion are mated.

10. The multi-functional end effector of claim 9 wherein the first portion and the second portion include complementary inclined surfaces inclined with respect to a direction of the relative movement between the nozzle and the fluid stream catcher, the first and second apertures being located on the complementary inclined surfaces.

11. The multi-functional end effector of claim 10 and further comprising at least one magnet secured to at least one of the first portion and the second portion to provide an attractive force.

12. The multi-functional end effector of claim 11 wherein the attractive force is in the direction of the relative movement between the nozzle and the fluid stream catcher.

13. The multi-functional end effector of claim 8 wherein each of the first portion and the second portion include spaced apart flange sections that mate together with the relative movement between the nozzle and the fluid stream catcher.

14. The multi-functional end effector of claim 13 wherein a magnet is secured on one of the flange sections of each pair of mating flange sections.

15. The multi-functional end effector of claim 8 and further comprising a spindle system mounted to the support structure.

16. The multi-functional end effector of claim 1, the support structure comprising a housing forming a passageway, the housing having a first end disposed on the axis of rotation and a second end secured to the frame member.

17. The multi-functional end effector of claim 1 and further comprising a milling spindle system.

18. A multi-functional end effector, comprising:
   a frame configured to be carried by a robotic system;
   a support structure rotatably mounted to the frame to rotate about an axis;
   a fluid stream cutting system fixedly mounted to the support structure, the fluid stream cutting system having a nozzle directing fluid in a first direction away from the support structure; and
   a laser scanning system fixedly mounted to the support structure, the laser scanning system having a laser and configured to direct the laser in a scanning direction that extends away from the support structure to obtain a scan of an object, wherein rotation of the support structure about the axis causes simultaneous rotation of the nozzle of the fluid stream cutting system and the laser scanning system such that the first direction and the scanning direction remain extending in opposite directions for any rotation of the support structure.

19. The multi-functional end effector of claim 18 wherein the fluid stream cutting system further includes a first portion movable with the nozzle, and a fluid stream catcher includes a second portion configured to selectively mate with the first portion.

20. The multi-functional end effector of claim 19 and further comprising a movable member mounted adjacent to the nozzle to move at least partially about the nozzle, the movable member carrying the first portion.

21. The multi-functional end effector of claim 19 wherein the first portion and the second portion comprise a mounting arrangement.

22. The multi-functional end effector of claim 18 and further comprising a spindle system mounted to the support structure.

23. A multi-functional end effector, comprising:
a frame configured to be carried by a robotic system;
a support structure;
a bearing assembly rotatably mounting the support structure to the frame to rotate about an axis;
a milling spindle system fixedly mounted to the support structure and having a spindle with an axis of rotation extending away from the support structure in a first direction;
a cutting system fixedly mounted to the support structure and having an operating end configured to be directed toward an object in a second direction away from the support structure to cut the object; and
a scanning system fixedly mounted to the support structure, the scanning system having a scanning device configured to be directed in a scanning direction that extends away from the support structure to obtain a scan of the object,
wherein rotation of the support structure about the axis causes simultaneous rotation of the operating end of the cutting system, the spindle of the milling spindle system, and the scanning device such that the second direction and the scanning direction remain extending in opposite directions for any rotation of the support structure.

24. The multi-functional end effector of claim 23, wherein the cutting system comprises a fluid stream cutting system having a nozzle configured to direct fluid away from the support structure.

25. The multi-functional end effector of claim 24 wherein the axis of rotation is orthogonal to the scanning direction and the first direction.

26. The multi-functional end effector of claim 25 wherein the scanning device is a laser.

* * * * *